(12) United States Patent
Colby

(10) Patent No.: US 7,516,404 B1
(45) Date of Patent: Apr. 7, 2009

(54) TEXT CORRECTION

(76) Inventor: Steven M. Colby, P.O. Box 52033, Palo Alto, CA (US) 94303

(*) Notice: Subject to any disclaimer, the term of this patent is extended or adjusted under 35 U.S.C. 154(b) by 0 days.

(21) Appl. No.: 10/859,734

(22) Filed: Jun. 2, 2004

Related U.S. Application Data

(60) Provisional application No. 60/475,578, filed on Jun. 2, 2003.

(51) Int. Cl.
*G06F 17/00* (2006.01)
(52) U.S. Cl. .................. 715/257; 715/255; 715/258; 715/200; 715/256
(58) Field of Classification Search ......... 715/530–533, 715/200, 255, 257, 258, 256
See application file for complete search history.

(56) References Cited

U.S. PATENT DOCUMENTS 5,576,995 A * 11/1996 Sato et al. .............. 365/185.27
6,618,697 B1 * 9/2003 Kantrowitz et al. ........... 703/22
7,149,970 B1 * 12/2006 Pratley et al. ............... 715/257
2002/0156816 A1 * 10/2002 Kantrowitz et al. ......... 707/530

OTHER PUBLICATIONS

Elmi et al, "Spelling Correct Using Context", 1998, Association for Computational Linguistics, p. 360-364.*
Brill et al, "An Improved Error Model for Noisy Channel Spelling Correction," 2000, Microsoft, pp. 1-9.*

* cited by examiner

*Primary Examiner*—Stephen S Hong
*Assistant Examiner*—David Faber

(57) ABSTRACT

Systems and methods of correcting grammatical and spelling errors that involve improper positioning of a whitespace character and/or an extra whitespace character. Removal of an extra whitespace character or repositioning of an improperly positioned whitespace character may result in correction of two misspelled words in a single correction step.

28 Claims, 4 Drawing Sheets

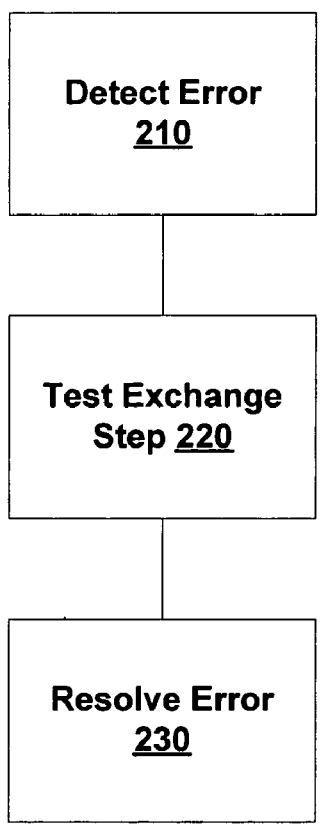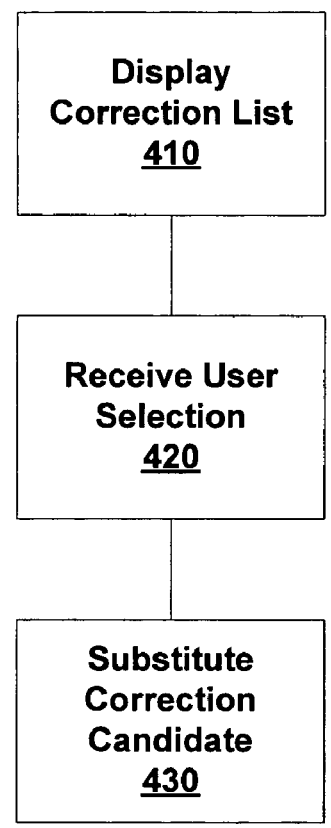
FIG. 2
FIG. 4

TEXT CORRECTION

CROSS-REFERENCE TO RELATED APPLICATIONS

This application claims benefit of U.S. provisional patent application No. 60/475,578 entitled "System and Method of Correcting Text" and filed Jun. 2, 2003, the disclosure of which is incorporated herein by reference.

BACKGROUND

1. Field of the Invention

The invention is in the field of computer programming and more specifically in the field of text processing.

2. Related Art

Text processing and text correction features are found in a wide variety of computing devices. For example, spelling and grammar correction are found in most word processing programs, presentation programs, database programs, and the like. It is desirable to make text and grammar correction as efficient as possible.

In current correction algorithms a single mistake that involves two words requires two separate corrections. For example, "spellingm istake" is a single misplacement of a whitespace character but requires separate correction steps to correct both "spellingm" and "istake." A similar problem occurs with mistakes such as "spelli ng," which involves an extra whitespace character. In this case, a first correction step is required to replace "spelli" with "spelling" and a second correction step is required to eliminate "ng."

Whitespace characters include a space, a tab, a carriage return, and the like used to separate non-whitespace characters. In some embodiments, these characters the ASCII characters represented by decimal values 32, 10, 11, 12, 13, or the like.

SUMMARY

The invention includes systems and methods of correcting text errors including those involving whitespace characters. In various embodiments, errors resulting from extra and/or misplaced whitespace characters are corrected in a single step. In some cases the single step results in the correction of two misspelled words.

Various embodiments of the invention include a method of correcting text, the method comprising detecting a word including a spelling error, testing to see if shifting a character to or from a first adjacent word in a first direction solves the spelling error, the first adjacent word being adjacent to the word including the spelling error, and resolving the spelling error responsive to the testing.

Various embodiments of the invention include a method of correcting text, the method including detecting an error in the text, testing to see if moving a location of a first whitespace character solves the error, and resolving the error responsive to the testing.

Various embodiments of the invention include a system for text processing, the system comprising memory configured to store text, a display configured to display the text, and computer instructions configured to identify and resolve an error resulting from improperly positioned whitespace character within the text, the resolution including a single replacement step involving replacing one or more words in the text with a correction candidate.

Various embodiments of the invention include a system for text processing comprising means for detecting a spelling error including a misplaced whitespace character, means for identifying a solution to the spelling error, and means for resolving the spelling error responsive to the solution.

Various embodiments of the invention include a system for text processing comprising means for detecting an error in text, the error including an extra whitespace character, means for identifying a solution to the error including eliminating the extra whitespace character, eliminating the extra whitespace character resulting in a reduction of a total number of words in the text, and means for resolving the error responsive to the solution.

Various embodiments of the invention include a computer readable medium, such as a RAM or compact disc, including computer instructions, the computer instructions comprising a code segment configured for detecting an error in text, a code segment configured for testing to see if moving a location of a first whitespace character solves the detected error, and a code segment configured for resolving the detected error responsive to the testing.

Various embodiments of the invention include a method of correcting text, the method comprising detecting a word including a spelling error, testing if elimination of a whitespace character resolves the spelling error without creating a new spelling error, and resolving the spelling error responsive to the testing.

Various embodiments of the invention include a method of correcting text, the method comprising detecting an extra whitespace character within the text, the extra whitespace character positioned between two words, testing if eliminating of the extra whitespace character results in converting the two words to one word, the one word being correctly spelled, and correcting the text responsive to the testing.

Various embodiments of the invention include a method of correcting text, the method comprising detecting a spelling error, determining a first correction candidate configured to replace one word in the text, determining a second correction candidate configured to replace two words in the text, displaying the first correction candidate and the second correction candidate to a user, and correcting the spelling error responsive to a selection received from the user, the selection being of the first correction candidate or the second correction candidate.

BRIEF DESCRIPTION OF THE VARIOUS VIEWS OF THE DRAWING

FIG. 2 illustrates a method of the correcting an error, according to various embodiments of the invention;

Figure 3A:
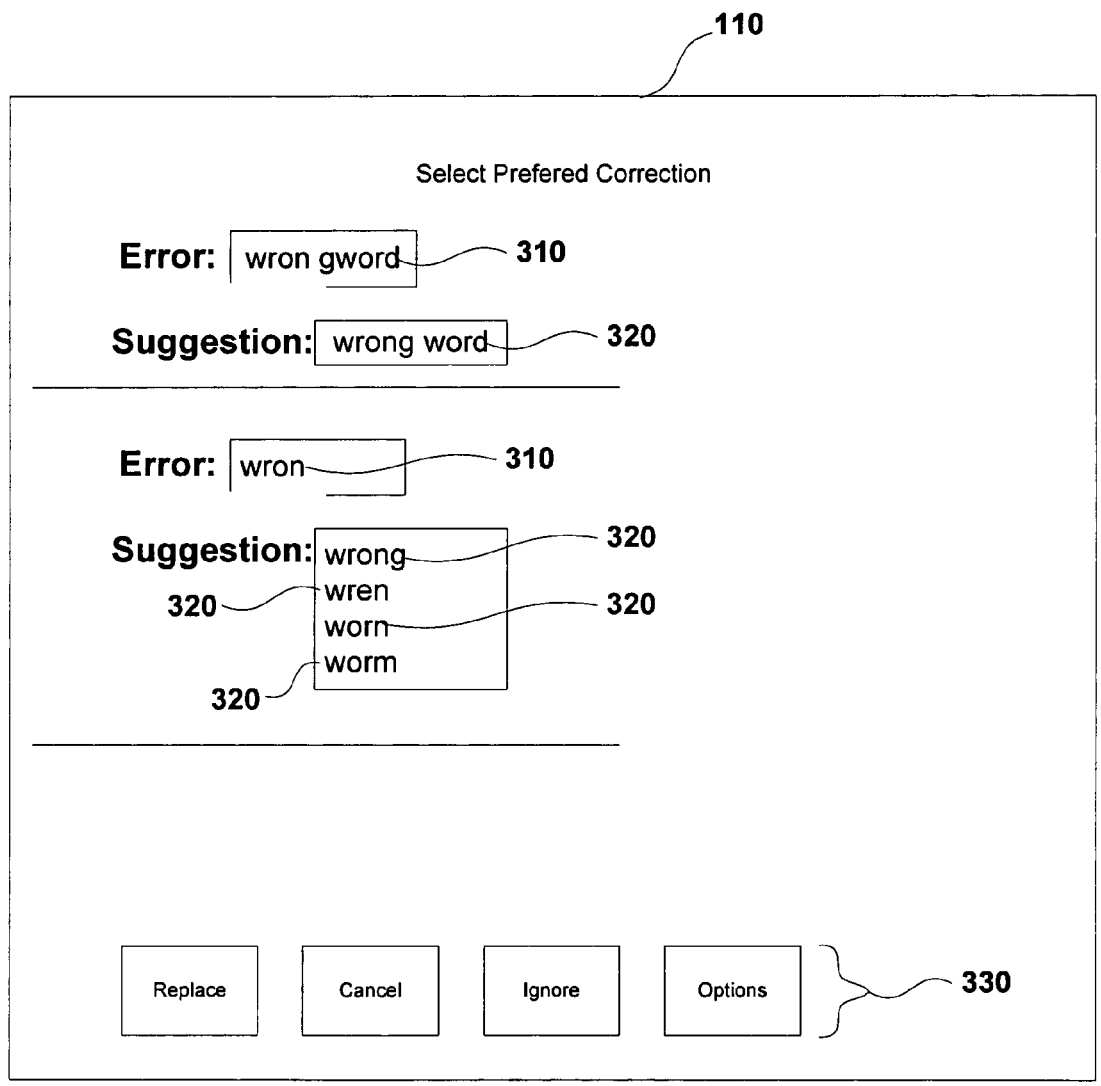
Figure 3B:
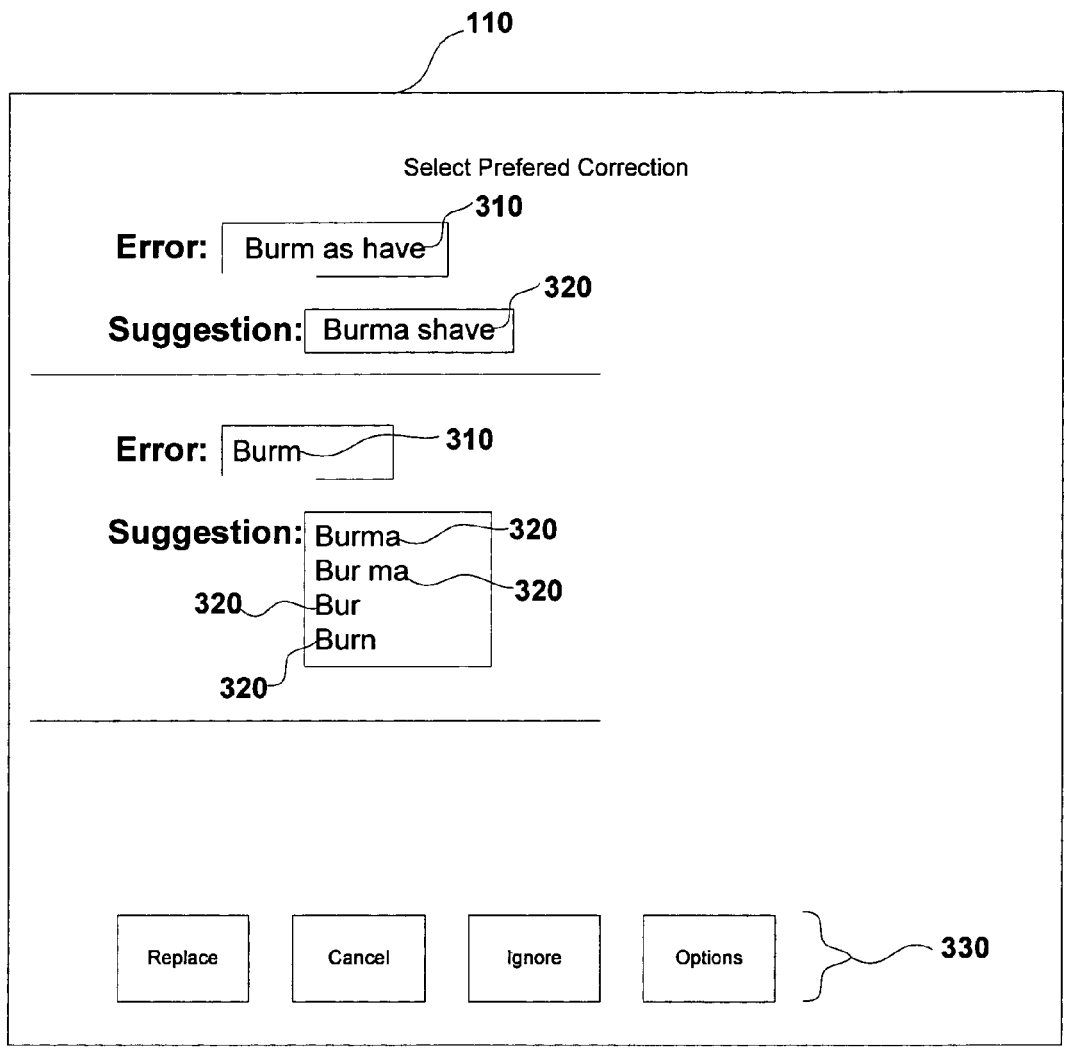

FIG. 3A and FIG. 3B each illustrate a different display used to present a correction list to a user, according to various embodiments of the invention; and FIG. 4 illustrates sub-steps within a resolve error step, according to some embodiments of the invention.

DETAILED DESCRIPTION

The invention includes systems and methods for correcting spelling and grammatical errors involving improper positioning and/or addition of an extra whitespace character. Examples of these errors corrected include: "makin g mistake" wherein an extra space is found between the "n" and the "g"; "making m istake" wherein an extra space is found between the "m" and the "i"; "makin gmistake" wherein the position of a space is incorrectly shifted to the right; "makingm istake"; wherein the position of a space is incorrectly shifted to the left. These errors may cause one or two spelling errors. For example, "I scorrect" includes one spelling error and "makin gmistake" includes two spelling errors.

In various embodiments, the error resulting from an additional space or an improperly positioned space results in a grammatical error. In some of these embodiments there is a grammatical error but not a spelling error. For example, if "It is one car seat" is incorrectly written as "It is one cars eat." there is a grammatical error but no spelling error resulting from an improperly positioned space.

Correction of these errors, grammatical or spelling, includes repositioning an improperly positioned whitespace character and/or removing an extra whitespace character. In some cases one spelling error is corrected and in some cases two errors are corrected in a single correction step. In some embodiments, the correction includes replacement of one word or replacement of two words, where a word is a group of non-whitespace characters between whitespace characters. For the purposes of this disclosure and claims, "are two" and "ar etwo?" are two words each. "Are three words" and "are t here" are three words. In some embodiments, correction of an error includes replacing two words with one word. In some embodiments, correction of an error includes replacing two words with two words.

Figure 1:
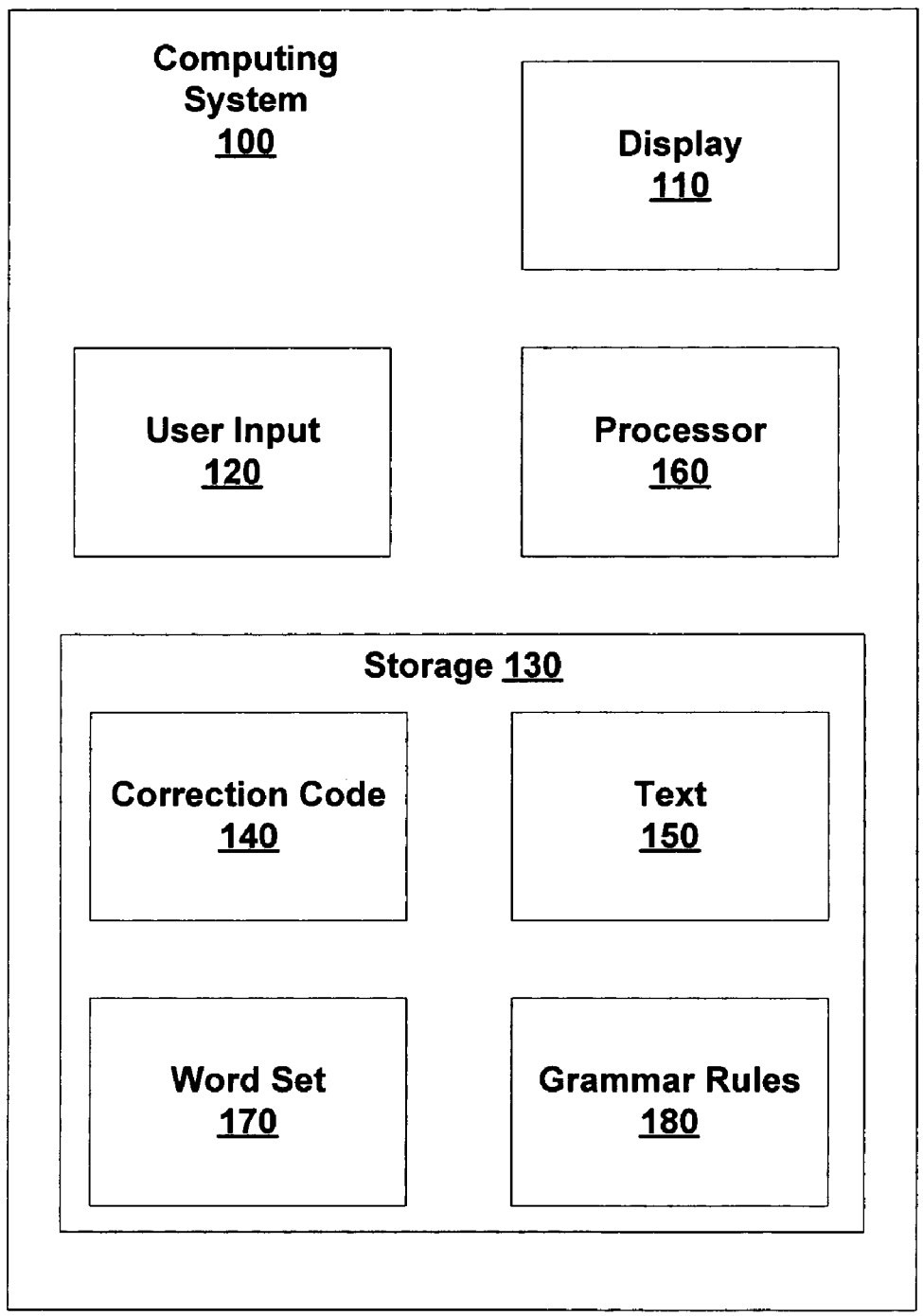
FIG. 1 is a block diagram illustrating a computing system, according to various embodiments of the invention.

FIG. 1 is a block diagram illustrating a Computing System 100, according to various embodiments of the invention. Computing System 100 includes a Display 110 configured to view text as well as an optional User Input 120 configured for a user to input text and/or select options presented on Display 110. Computing System 100 further includes Storage 130, configured to store, for example, Correction Code 140 and Text 150. A Processor 160 is configured to execute Correction Code 140 and control Display 110.

In various embodiments, Display 110 includes a computer screen, personal digital assistant display, an electronic book display, a video display, a communication device display, a telephone display, or the like.

In various embodiments, User Input 120 includes a button, a keyboard, graphical user interface, handwriting recognition device, touch sensitive device, or the like. In various embodiments, User Input 120 includes a digital data input device such as a communications port (e.g., an Ethernet, a serial or parallel port), a memory interface, a drive (e.g. hard drive, floppy drive, compact disk drive, digital versatile disk drive), or the like. In these embodiments, User Input 120 is used to transfer text data to Computing System 100. For example, in one embodiment User Input 120 includes a compact disk drive configured to read text data from a compact disk.

In various embodiments, Storage 130 includes digital (fixed or removable) memory such as RAM, SRAM, compact disk, digital versatile disk, floppy disk, hard drive, or the like. Storage 130 is configured to store Correction Code 140 and Text 150, and optionally a Word Set 170 and/or Grammar Rules 180. In some embodiments, Storage 130 is distributed among several devices.

Correction Code 140 includes computer code configured to perform methods of the invention as described further herein. For example, in various embodiments, Correction Code 140 includes code configured to detect an error including an improperly positioned whitespace character and/or code configured to detect an error including an extra whitespace character positioned within what should be one word. Further, in various embodiments, Correction Code 140 includes code to offer a user one or more possible correction candidates configured for correcting errors involving a whitespace character.

In various embodiments, Text 150 is character-based text including an alphabet of characters used to form words separated by whitespace. Text 150 is typically received by Computing System 100 using User Input 120.

Word Set 170 is a set of words whose spelling is considered to be correct. For example, Word Set 170 may be a predefined or a user defined dictionary. Grammar Rules 180 is a set of grammatical rules configured for detecting errors in grammar.

FIG. 2 illustrates a method of the correcting an error in Text 150, according to various embodiments of the invention.

In a Detect Error Step 210, an error is detected in Text 150, using Correction Code 140. In some embodiments, Detect Error Step 210 includes parsing Text 150 and comparing words found in Text 150 with words in Word Set 170. In some embodiments, Detector Error Step 210 includes parsing Text 150 and comparing Text 150 with grammatical rules stored in Grammar Rules 180. When a word in Text 150 does not match a word in Word Set 170, the word in Text 150 is flagged as including an error.

In some embodiments, Detect Error Step 210 includes monitoring the addition of new text, using User Input 120, to Text 150. As new words are added or old words are modified, they are compared with words in Word Set 170. When a new or altered word in Text 150 does not match a word in Word Set 170, the word in Text 150 is flagged as including an error. In some embodiments, Detect Error Step 210 includes parsing Text 150 for grammatical errors. In these embodiments, a word or words of Text 150 are analyzed using Grammar Rules 180. If the word or words do not fit within the grammatical rules then the words are flagged as including an error.

In some embodiments, Detect Error Step 210 includes systems and methods used by the software programs Microsoft Word®, Microsoft PowerPoint®, Microsoft Outlook®, Microsoft Excel®, Lotus-123®, EMACS, WordPerfect®, Microsoft Access®, Microsoft Visio®, Microsoft FrontPage®, or the like, to detect an error in text.

In various embodiments Detect Error Step 210 includes detecting the errors such as "wron gword," "wrongw ord," "wro ngword," "wrong w ord," "wro ng word," or the like. These errors reflect a character or characters incorrectly shifted to the right, a character incorrectly shifted to the left, and an incorrect extra whitespace character, etcetera.

In a Test Exchange Step 220, Correction Code 140 is used to determine if an error, flagged in Detect Error Step 210, is corrected by exchanging one or more letter between adjacent words, moving a whitespace character, eliminating a whitespace character, or like action. An error is considered corrected if the words in the corrected text would match words in Word Set 170 following the action. There may be more than one possible correction for an error. Each possible correction is considered a "correction candidate." In some cases, exchanging one or more letter between adjacent words is equivalent to moving a whitespace character. Also, in some cases, removing and then adding a whitespace character is equivalent to moving a whitespace character. These equivalencies are meant to be included in the term "moving a whitespace character" in this disclosure and claims.

In some embodiments of Test Exchange Step 220, Error Correction Code 140 tests for a character (whitespace or non-whitespace) incorrectly shifted to the right. For example, in one embodiment Error Correction Code 140 tests to see if "wron gword" is corrected by shifting the "g" back to produce "wrong word," or if "wro ngword" is corrected by shifting the "ng" back to produce "wrong word."

In some embodiments of Test Exchange Step 220, Error Correction Code 140 is configured to test for a character incorrectly shifted to the left. For example, in one embodiment, Error Correction Code 140 tests to see if "wrongw ord"

is corrected by shifting the "w" forward to produce "wrong word." In some embodiments, similar tests are applied to the errors "wrong w ord" and "wron g word," (each including three words). In these tests the shifted character is the only letter of the words "w" and "g" and a correction candidate, such as "wrong word" (including the grammatical error of having two spaces between the words) or "wrong word" (including one space between the words), include fewer total words than the text with the error. (In some embodiments having two spaces between words is considered a grammar error.) In cases such as these, a space is optionally deleted so that there is not a double space between the remaining words. In these embodiments, the correction candidate includes fewer words than the original text.

In some embodiments of Text Exchange Step 220, Error Correction Code 140 is configured to test for an extra whitespace character. For example, in one embodiment, Error Correction Code 140 tests to see if "wro ng" is corrected by eliminating a whitespace character next to a word flagged as having an error, to produce "wrong." In these embodiments, the correction candidate includes fewer words than the original text.

Test Exchange Step 220 optionally includes a plurality of tests, such as those described herein. Typically, a series of tests will be made until one or more possible correction candidates, such as "wrong word," are found.

In some embodiments of Test Exchange Step 220, correction candidates are given a greater relevancy if they correct two spelling mistakes at once instead of just correcting one spelling mistake. For example, the phrase "wron gword" includes two words that typically would be flagged has having a spelling error in Detect Error Step 210. The correction candidate "wrong word" corrects both of these spelling errors and thus may be given greater relevancy than a correction candidate that dealt with only one of the words at a time. In other words, Correction Code 140 could either deal just with correcting the word "wron" and arrive at correction candidates such as "worn," "wrong," "wren" and/or Correction Code 140 could apply the tests of Test Exchange Step 220 and find the correction candidate "wrong word." Since the correction candidate "wrong word" corrects two errors it may be given greater relevancy.

In a Resolve Error Step 230 the one or more correction candidates found in Test Exchange Step 220 are optionally used to correct Text 150 by replacing the text including the error found in Detect Error Step 210 with one of the correction candidates found in Text Exchange Step 220. For example, in an embodiment wherein Text 150 includes the sentence, "Be sure not to use the wrongw ord in a patent claim" and a correction candidate is "wrong word," Resolve Error Step 230 may include correcting Text 150 to read "Be sure not to use the wrong word in a patent claim." In this case two spelling errors are corrected using a single correction candidate in a single correction step. In some embodiments, the replacement is made automatically using Correction Code 140. In one of these embodiments the correction candidate with the greatest relevancy is used to correct the error.

In some embodiments of Resolve Error Step 230, the correction is made by offering the one or more possible correction candidates to a user, and requesting that the user choose a preferred correction candidate from among the offered correction candidates. For example, in response to the error "wron gword" the user may be offered the following list of correction candidates: "wrong word," "wrong," "wren," and "worn." If the user then selects a preference, the selected correction candidate is used to replace the text including the error found in Detect Error Step 210. In some embodiments, the total number of words in Text 150 is reduced in Resolve Error Step 230. For example, when "wrong w ord" (three words) is replaced by "wrong word" (two words), one word is eliminated. When the correction candidate is selected by Correction Code 140 based on both the first and second error, the correction candidate (e.g., "wrong word") may include two words. Thus, both errors may be corrected in a single correction step, e.g., through one replacement step involving a single correction candidate. Alternatively, when the correction candidate is selected by Correction Code 140, based on only the first error then only the first error is typically corrected. Thus, in alternative embodiments, selecting "wrong" as the correction candidate responsive to the error "wron gword" would result in a correction to "wrong gword" an a second correction step would be required to correct "gword."

In some embodiments, the list of correction candidates displayed to a user includes indication of which correction candidates would be used to change two words and which correction candidates would be used to change one word. FIG. 3A and FIG. 3B each illustrate a different embodiment of Display 110 used to present a correction list to a user. Part of Display 110 indicates Text To Be Replaced 310, part of Display 110 indicates Correction Candidates 320, and part of Display 110 presents User Options 330. Text To Be Replaced 310 optionally includes a phrase having several words (e.g. "wron gword"). In FIG. 3B one of the Correction Candidates 320 is "Burma shave." In various embodiments, this correction candidate is arrived at from the phrase "Burm as have" having an error. For example, in Test Exchange Step 220, Correction Code 140 may first deal with the word "Burm" alone. Correction Candidates 320 such as "burn" are found. Correction Code 140 then tests for errors involving the positioning of a whitespace character and/or exchanging characters with adjacent words, and finds "Burma s" as a correction candidate. However, this correction candidate generates a new error, "s." Correction Code 140 then tests for correction candidates including the next word and finds that by moving another character a correction candidate, "Burma shave," without errors is found. This multi-step process considers first one word, then two, then three words in search for Correction Candidates 320.

Returning to Resolve Error Step 230 of FIG. 2, the preferred Correction Candidate 320 is optionally displayed to the user, and if selected by the user is used to replace the text including an error.

FIG. 4 illustrates sub-steps within an embodiment of the single correction step Resolve Error Step 230.

In a Display Correction List Sub-step 410 a list of identified Correction Candidates 320 is shown to a user using Display 110. As illustrated in FIG. 3A and FIG. 3B, this list is typically associated with a display of Text To Be Replaced 310. There may be more than one instance of Text To Be Replaced 310 displayed at the same time. For example, in FIG. 3A there are two instances of Text To Be Replaced 310, "wron gword" and "wron." Thus, a user is given more than one option of which text is to be corrected.

In a Receive User Selection Sub-step 420, Processor 160 receives a selection of one of the displayed Correction Candidates 320 from a user. By selecting a preferred Correction Candidate 320 the user may also be specifying which of Text To Be Replaced 310 is to be replaced by the Correction Candidate 320. For example, if a user selects the Correction Candidate 320 "wrong word" in FIG. 3A, then the selected Correction Candidate 320 will be used to replace Text To Be Replaced 310 "wron gword." In contrast, if the user selects the Correction Candidate 320 "wrong," then the selected Correction Candidate 320 will be used to replace Text To Be Replaced 310 "wron."

In a Substitute Correction Candidate Sub-step 430 the selected Correction Candidate 320 is used to replace the associated Text To Be Replaced 310.

Embodiments of the invention include looking for sequential words with errors and attempting to correct the errors with a single replacement step. Some of these embodiments include offering to the user suggested correction candidates that include more than one word configured to replace more than one word. Some of these embodiments include offering the user a suggested correction candidate that corrects more than one error.

Several embodiments are specifically illustrated and/or described herein. However, it will be appreciated that modifications and variations are covered by the above teachings and within the scope of the appended claims without departing from the spirit and intended scope thereof. For example, while the discussion of the invention uses the "space character" as an example of a whitespace character, it is within the scope of the invention to correct errors involving other whitespace characters, (e.g., a tab character).

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

I claim:

1. A method of correcting text, the method comprising:
   detecting a word including a spelling error;
   testing to see if shifting a letter to or from a first adjacent word in a first direction solves the spelling error, the first adjacent word being adjacent to the word including the spelling error, wherein shifting a character to or from a first adjacent word includes shifting part, but not all, of the adjacent word to the word including the spelling error;
   testing to seeing if shifting a letter to or from the first adjacent word in a second direction solves the error; and
   resolving the spelling error responsive to the testing.

2. The method of claim 1, wherein the first direction is to the right.

3. The method of claim 1, wherein the first direction is to the left.

4. The method of claim 1, wherein resolving the spelling error includes displaying a correction candidate to a user prior to correcting the text.

5. The method of claim 4, wherein the correction candidate includes more than one word.

6. The method of claim 4, wherein the correction candidate is configured to replace more than one word in the text.

7. The method of claim 6, wherein the correction candidate includes two separate words.

8. The method of claim 1, wherein resolving the spelling error is automatic if the resolution fixes more than one spelling error, and not automatic if the resolution fixes only one spelling error.

9. The method of claim 1, wherein resolving the detected error is automatic.

10. The method of claim 1, wherein resolving the detected error includes replacing the text including the detected error with a correction candidate.

11. The method of claim 10, wherein the correction candidate includes two words.

12. The method of claim 10, wherein the replaced text includes more than one word.

13. The method of claim 1, where resolving the error is responsive to more than one adjacent spelling errors.

14. A computer readable medium including computer instructions, the computer instructions comprising:
    a code segment configured for detecting a word including a spelling error;
    a code segment configured for testing to see if shifting a letter to or from a first adjacent word in a first direction solves the spelling error, the first adjacent word being adjacent to the word including the spelling error, wherein shifting a character to or from a first adjacent word includes shifting part, but not all, of the adjacent word to the word including the spelling error;
    a code segment configured for testing to seeing if shifting a letter to or from the first adjacent word in a second direction solves the error; and
    a code segment configured for resolving the spelling error responsive to the testing.

15. The method of claim 1, wherein the word including the spelling error is entered by a user.

16. The method of claim 1, wherein the spelling error is resolved without adding or removing the whitespace.

17. The method of claim 1, wherein the misspelling is the word is a result of a whitespace character being in a position other than a position where it should be.

18. The computer readable medium of claim 14, wherein the first direction is to the right.

19. The computer readable medium of claim 14, wherein the first direction is to the left.

20. The computer readable medium of claim 14, wherein resolving the spelling error includes displaying a correction candidate to a user prior to correcting the text.

21. The computer readable medium of claim 20, wherein the correction candidate includes more than one word.

22. The computer readable medium of claim 20, wherein the correction candidate is configured to replace more than one word in the text.

23. The computer readable medium of claim 22, wherein the correction candidate includes two separate words.

24. The computer readable medium of claim 14, wherein resolving the spelling error is automatic if the resolution fixes more than one spelling error, and not automatic if the resolution fixes only one spelling error.

25. The computer readable medium of claim 14, wherein resolving the spelling error is automatic if the resolution fixes more than one spelling error, and not automatic if the resolution fixes only one spelling error.

26. The computer readable medium of claim 14, wherein resolving the detected error is automatic.

27. The computer readable medium of claim 14, wherein resolving the detected error includes replacing the text including the detected error with a correction candidate.

28. The method of claim 14, where resolving the error is responsive to more than one adjacent spelling errors.

* * * * *

UNITED STATES PATENT AND TRADEMARK OFFICE
CERTIFICATE OF CORRECTION

PATENT NO. : 7,516,404 B1  
APPLICATION NO. : 10/859734  
DATED : April 7, 2009  
INVENTOR(S) : Steven M. Colby It is certified that error appears in the above-identified patent and that said Letters Patent is hereby corrected as shown below:

In the Claims

In column 8 line 31 Claim 16 please replace "the whitespace" with --a whitespace--

In column 8 line 32 Claim 17 please replace "the misspelling" with --the spelling error--

In column 8 line 41 Claim 20 please replace "the text," with --a text--

In column 8 line 61 Claim 27 please replace to "the text," with --text--

In column 8 line 63 Claim 28 please replace "The method of claim 14," with --The computer readable medium of claim 14,--

Signed and Sealed this  
Sixteenth Day of December, 2014

Michelle K. Lee  
*Deputy Director of the United States Patent and Trademark Office*